US008081105B2

(12) United States Patent
Tigrek et al.

(10) Patent No.: US 8,081,105 B2
(45) Date of Patent: Dec. 20, 2011

(54) METHOD FOR MEASURING THE RADIAL VELOCITY OF A TARGET WITH A DOPPLER RADAR

(75) Inventors: Recep Firat Tigrek, Delft (NL); Wilhelmus Johannes De Heij, Enschede (NL)

(73) Assignee: Thales Nederland B.V. (NL)

( * ) Notice: Subject to any disclaimer, the term of this patent is extended or adjusted under 35 U.S.C. 154(b) by 187 days.

(21) Appl. No.: 12/390,603

(22) Filed: Feb. 23, 2009

(65) Prior Publication Data

US 2009/0237292 A1    Sep. 24, 2009

(30) Foreign Application Priority Data

Feb. 22, 2008  (NL) ...................................... 1035066

(51) Int. Cl.
*G01S 7/28* (2006.01)
*G01S 7/32* (2006.01)
*G01S 13/00* (2006.01)

(52) U.S. Cl. ........ 342/105; 342/104; 342/145; 342/175; 342/195; 342/196; 342/202; 342/204; 375/130; 370/203; 370/208

(58) Field of Classification Search .......... 342/104–117, 342/118, 127, 134–145, 175, 192–197, 21, 342/22, 59, 200–204, 52–56, 25 R–25 F; 370/203–211; 375/130–153, 259–267, 316, 375/322, 324–328
See application file for complete search history.

(56) References Cited

U.S. PATENT DOCUMENTS

| | | | | |
|---|---|---|---|---|
| 4,388,622 A | * | 6/1983 | Fletcher, Jr. ................... | 342/112 |
| 5,374,931 A | * | 12/1994 | Wiener ........................... | 342/115 |
| 5,646,623 A | * | 7/1997 | Walters et al. ................. | 342/200 |
| 6,300,895 B1 | * | 10/2001 | Carrara et al. ................... | 342/55 |
| 6,392,588 B1 | | 5/2002 | Levanon et al. | |
| 6,720,909 B1 | | 4/2004 | Dedden et al. | |
| 6,924,763 B2 | * | 8/2005 | Poullin ........................... | 342/195 |
| 6,999,025 B2 | * | 2/2006 | Poullin ........................... | 342/107 |
| 7,130,361 B1 | * | 10/2006 | Enderlein et al. .............. | 375/324 |
| 7,586,992 B2 | * | 9/2009 | Kwun et al. .................... | 375/267 |
| 7,852,955 B2 | * | 12/2010 | Wang et al. .................... | 375/260 |

(Continued)

FOREIGN PATENT DOCUMENTS

EP    0681190 A1 * 11/1995

(Continued)

OTHER PUBLICATIONS

Franken et al., 2006. "Doppler Tolerance of OFDM-Coded Radar Signals." Proc. 3rd European Radar Conference, Manchester UK, pp. 108-111.
Tigrek, et al,, 2007. "A Golay code based approach to reduction of the PAPR and its consequence for the data throughput." Proc. 4th European Radar Conference, Munich, Germany, pp. 146-149.

(Continued)

*Primary Examiner* — Bernarr Gregory
(74) *Attorney, Agent, or Firm* — Stroock & Stroock & Lavan LLP

(57) ABSTRACT

An embodiment of the invention includes a step of transmitting an OFDM waveform including several frequency carrier signals transmitted simultaneously, the frequency carrier signals being coded in order to improve the Doppler response. An embodiment of the invention includes a step of receiving the echoed waveform from the target. The initial phase of each frequency carrier signal is recovered from the echoed waveform. The recovered initial phase of each frequency carrier signal is cyclically shifted in order to compensate for the Doppler effect and subsequently decoded. A compressed pulse is synthesized from the decoded initial phases.

5 Claims, 9 Drawing Sheets

U.S. PATENT DOCUMENTS

| | | | |
|---|---|---|---|
| 7,856,066 B2 * | 12/2010 | Tanaka et al. | 375/260 |
| 2004/0066331 A1 * | 4/2004 | Poullin | 342/109 |
| 2004/0257270 A1 * | 12/2004 | Poullin | 342/107 |

FOREIGN PATENT DOCUMENTS

| | | | |
|---|---|---|---|
| EP | 2124071 A1 * | 11/2009 | |
| WO | WO 02/063335 A1 * | 8/2002 | |
| WO | WO 03/056358 A1 * | 7/2003 | |

OTHER PUBLICATIONS

Tigrek, et al., 2008. "Solving Doppler Ambiguity by Doppler Sensitive Pulse Compression Using Multi-Carrier Waveform." Proc. 5th European Radar Conference, Amsterdam, The Netherlands, pp. 72-75.

* cited by examiner

METHOD FOR MEASURING THE RADIAL VELOCITY OF A TARGET WITH A DOPPLER RADAR

CROSS-REFERENCE TO RELATED APPLICATIONS

The present application claims the benefit of Netherlands Patent Application Serial No. 1035066, filed Feb. 22, 2008 which is hereby incorporated by reference in its entirety.

FIELD OF THE INVENTION

The invention is in the field of radar and similar ranging techniques, which detect remote targets and determine target parameters such as range and radial velocity. The invention relates to the signal structure and associated processing technique that estimates the target range and radial velocity.

BACKGROUND OF THE INVENTION

The remote detection systems determine target parameters such as range and radial velocity by transmitting a waveform and comparing, through various processing methods, the transmitted waveform and the received signal that is echoed from the target. The range of the target is determined through the measurement of the time of arrival of the echo and the radial velocity is measured from the Doppler effect, which is caused by the signal echoing from a target with non-zero radial velocity. The Doppler effect manifests itself as a shift in the frequency in single carrier radars when the narrow band signal approximation is valid. To measure the Doppler effect, the phase of the received echo is compared to the phase of the transmitted signal. The technique used for measuring the frequency shift depends on the radar waveform.

The important attributes of a radar system, among others, are the range and radial velocity resolution and ambiguity. The resolution is the minimum parameter spacing between the two targets so that they are identified by the radar system as distinct targets. Ambiguity is the case when the measured waveform parameter value may correspond to more than one target parameter value. With the choice of waveform and processing technique determining the resolution and ambiguity, the goal is to measure the target parameters unambiguously for a given maximum range and velocity with high resolution.

Current tendency in radar systems is to form networks of radars to improve the system performance through data fusion. Such networking must be accomplished through a communication system that is independent of the commercial communication infrastructure for reliability requirements. Wireless communication is preferable for the same reason. Embedding the communication into the radar signal is considered as a solution that enables the double use of the radar transmitter, with increased communications security.

In pulsed Doppler radars, the ambiguity in the radial velocity is solved by varying the pulse repetition frequency (PRF) or the carrier frequency (RF) from burst to burst. The maximum unambiguous radial velocity is related to the pulse repetition frequency and the carrier frequency through the equation $$v_{u,max} = \frac{1}{2} f_p \lambda,$$

where $f_p$ is the pulse repetition frequency and $\lambda$ is the carrier wavelength. Varying any of two results in a different maximum ambiguous velocity.

The velocity obtained from Doppler processing can be written as $$v = v_0 + n v_{u,max},$$

where v is the actual velocity, $v_0$ is the measured velocity that is smaller than the maximum unambiguous velocity, and n is an integer number. When two different maximum unambiguous velocities are obtained through varying the PRF or RF, the actual velocity can be determined through the equation above.

The choice of PRF affects the range ambiguity as well. The maximum unambiguous range that can be measured with given PRF is $$R_{u,max} = \frac{1}{2} \frac{c}{f_p}.$$

Similar to the Doppler ambiguity, the range measurement obtained from the range processing can be written as $$R = R_0 + n R_{u,max},$$

where R is the actual velocity, $R_0$ is the measured velocity that is smaller than the maximum unambiguous velocity, and n is an integer number.

Pulsed radars have limited transmission power capability due to the low duty cycle required for unambiguous and high-resolution range measurement. Pulse compression techniques increase the average transmitted power by spreading the pulse energy over a longer portion of the pulse period. One pulse compression technique is the phase coding of the transmitted waveform, where phase codes can be arranged to produce favorable range profiles with lower range sidelobes. The range is measured by the correlation of the transmitted phase coded waveform with the received echo. The correlation peaks correspond to the locations of the significant reflectors, and the phase variation of the correlation peaks from pulse to pulse is used to measure the radial velocity of the reflectors.

Another pulse compression technique is to transmit a chirp pulse that sweeps a frequency band for the pulse duration. As the beat frequency, resulting from the mixing of the replica of the transmitted signal and the received echo, is governed by both the delay and the frequency shift due to target radial velocity, the range and radial velocity measurements are coupled to each other in linear FM pulsed radar. The radial velocity ambiguity persists, since the phase variation of the correlation peaks from pulse to pulse is used to measure the radial velocity of the reflectors as in phase coded pulsed radar.

Continuous wave (CW) radars can have phase-coded or frequency modulated signals, similar to pulsed radars. Mathematically the CW radar signal can be considered as a pulse train composed of pulses with 100% duty cycle. The same pulse compression and Doppler measurement techniques apply to the CW radar.

U.S. Pat. No. 6,392,588 discloses multi-carrier radar signal with the emphasis on reduction of the range sidelobes and low peak to mean envelope power ratio, provided by the use of specific phase sequences for modulating the carriers. The phase sequences proposed in the patent, named Multifrequency Complementary Phase Coded (MCPC) signal, are based on the modulation of M sub-carriers by sequences of length M that comprise a complementary set. The range sidelobes are controlled through frequency weighting and use of additional pulses so that sequences along a carrier constitute a complementary set in time.

The Doppler tolerance of multi-carrier radar signal is inspected in the article: G. E. A. Franken, H. Nikookar, P. van Genderen, "Doppler Tolerance of OFDM-Coded Radar Signals", Proc. 3$^{rd}$ European Radar Conference, September 2006, Manchester UK. The degradation of the pulse compression gain for the OFDM waveform is demonstrated in the article, with the proposal of a bank of Doppler filters, responses of which intersect at 1 dB compression loss. The filter bank is proposed to be constructed by using reference signals in the compression filter that are frequency shifted to obtain the response explained above.

Dual use of OFDM as the radar waveform and for communications is inspected in the article: D. Garmatyuk, J. Schuerger, T. Y. Morton, K. Binns, M. Durbin, J. Kimani, "Feasibility Study of a Multi-Carrier Dual-Use Imaging Radar and Communication System," in Proc. 4$^{th}$ European Radar Conf, 2007, pp. 194-197. The inspection considers the SAR imaging with OFDM waveform and communications through OFDM separately.

U.S. Pat. No. 6,720,909 discloses processing technique for single carrier pulsed Doppler radar waveform. The technique solves the Doppler and range ambiguity by staggering the pulse positions. The staggering enables the solving of the range ambiguity caused by the pulse interval being shorter than the maximum range of interest. The staggering also increases the maximum unambiguous radial velocity to a higher value, which is determined by the lowest bisector of the staggered pulse intervals.

In pulsed Doppler radar systems the pulse repetition frequency or the carrier frequency is varied from burst to burst to resolve the ambiguity in radial velocity. However, as the radial velocity resolution is determined by the time on target, the parameter change can be realized only after the required resolution is achieved with the current pulse burst. This, in turn, requires the radar beam to spend longer time on target.

The pulse compression techniques based on phase coding of the transmitted pulse are intolerant to Doppler; the compression gain rapidly decreases with the increasing Doppler effect. The exacerbating of the pulse compression depends on the phase shift introduced by the Doppler effect during one phase chip in the pulse, and significant range side lobe deterioration is reported for phase shifts exceeding 30-40 degrees per chip in the article: R. M. Davis, R. L. Fante, R. P. Perry, "Phase-Coded Waveforms for Radar", IEEE Trans. Aerospace and Electronic Systems, vol. 43, No. 1, January 2007.

In the article above the use of shorter compression pulses or multiple pulse compression filters with each filter tuned to a different Doppler frequency is proposed for mitigating the Doppler intolerance. Shorter compression pulses correspond to higher pulse repetition frequency if the peak and average power levels are to be kept constant, which in turn causes ambiguity in range.

The second approach in the article is to use a bank of pulse compression filters with each filter matched to the replicas of the transmitted waveform with different Doppler frequency. In the article the use of the filters is restricted to the mitigating of the compression loss; data from different coherent processing intervals is needed to solve the ambiguity in radial velocity, which corresponds to using multiple trains of pulses.

U.S. Pat. No. 6,392,588, which discloses the multicarrier MCPC waveform, does not address the radial velocity resolution, ambiguity arising from the use of the pulsed waveform, the deterioration of pulse compression due to the Doppler effect and possible solutions to the Doppler intolerance of the pulse compression.

The article: G. E. A. Franken, H. Nikookar, P. van Genderen, "Doppler Tolerance of OFDM-Coded Radar Signals", Proc. 3$^{rd}$ European Radar Conference, September 2006, Manchester UK, does not propose any solution to the Doppler ambiguity. The proposed technique aims to mitigate the compression loss resulting from the Doppler effect only. Furthermore, no structure to implement the Doppler shifted filters is proposed.

A Doppler radar using two multi-carrier pulses is proposed in the article: J. Duan, Z. He, C. Han, "A Novel Doppler Radar Using only Two Pulses", Radar 2006, CIE '06, October 2006. The differential phase between the two pulses for each carrier is measured to determine the radial velocity of the target. While the article addresses the unambiguous measurement of the radial velocity, the Doppler resolution is not considered. Moreover, the carriers are assumed to be recoverable independently after the range gate alignment, which does not take in to account that the frequency components are not orthogonal anymore when the receiving frame is not aligned with the reflected echo. Possibility of coding on the carriers is not mentioned, assuming the transmission of the same pulse twice without any coding. Such pulses have very high Peak to Average Power Ratio (PAPR), leading to very low average transmitted power and possibly distortion due to the amplifier entering the saturation region.

In the article: D. Garmatyuk, J. Schuerger, T. Y. Morton, K. Binns, M. Durbin, J. Kimani, "Feasibility Study of a Multi-Carrier Dual-Use Imaging Radar and Communication System," in Proc. 4$^{th}$ European Radar Conf, 2007, pp. 194-197, the Doppler effect is not considered, as the Doppler information is of no interest for the intended SAR application. Thus, the focus in the article is on cross-range imaging.

U.S. Pat. No. 6,720,909 is related to the single carrier pulsed Doppler radar waveforms, where the duty cycle and the average transmitted power is low. Pulse compression techniques to improve the average transmitted power are not considered. An embodiment of the invention disclosed here solves the Doppler ambiguity by means of Doppler compensation before the pulse compression, at the same time improving the average power and enabling high signal bandwidth thanks to the multi-carrier structure.

Failing at combining the multiple functionalities that exist individually, the prior art teaches that consecutive pulse trains with different RF or different PRF must be used to solve the radial velocity ambiguity. This is one of the problems that an embodiment of the present invention aims at solving.

The method given in the article: J. Duan, Z. He, C. Han, "A Novel Doppler Radar Using only Two Pulses", Radar 2006, CIE '06, October 2006 cannot be applied on the other multi-carrier waveform schemes that do not consider the Doppler effect. The proposed method requires transmission of the same multi-carrier waveform twice without any coding on the carriers, while the other methods require specific coding of the carriers.

The guard interval is not considered in the indicated previous art. Guard interval is a crucial component of the multi-carrier waveform. The multi-path effects are eliminated from the waveform when the guard interval duration is longer than the channel length. Multi-path effects introduce inter-symbol interference and inter-carrier interference, leading to high bit error rate in communications.

Introducing cyclic repetition of the waveform as the guard interval may introduce range ambiguity, a problem that is solved inherently in an embodiment of the present invention due to the receiving scheme being designed to utilize the cyclic prefix. The cyclic prefix is utilized in the embodiment as in a communications waveform, with the duration of the cyclic prefix being longer than the response time from the maximum range of interest. Such timing constraint enables the recovery of the carriers' starting phases, which enables both the Doppler frequency shift compensation and the pulse compression.

SUMMARY OF THE INVENTION

An embodiment of the present invention aims to provide a processing technique that is applicable to a pulse compression waveform with multi-carrier structure, which includes an OFDM waveform. The proposed waveform and the corresponding processing technique measures the radial velocity using a pulse train, without the need for using consecutive pulse trains with different RF or different pulse repetition frequencies to solve the radial velocity ambiguity. An important idea of the processing technique is based on the deteriorating pulse compression gain due to the Doppler effect manifesting itself as RF frequency shift.

According to one of its aspects, an embodiment of the present invention may provide a method for measuring the radial velocity of a target with a radar. The method includes a step of transmitting an OFDM waveform including N frequency carriers $(p_m)_{m° \epsilon° \{0, \ldots, N-1\}}$ transmitted simultaneously, where $N° \geq ° 2$, the frequency carriers $(p_m)_{m° \epsilon° \{0, \ldots, N-1\}}$ being coded in order to improve the Doppler response. The waveform p includes OFDM chips and guard time intervals that are transmitted successively to form a continuous wave transmission, the duration $T_{cyc}$ of the guard time intervals being longer than $$\frac{2R_{max}}{c},$$

where c is the speed of the light, which is the time necessary for the waveform p to be reflected from a maximum range of interest $R_{max}$. The method also includes a step of receiving the waveform echoed from the target. The initial phase $\phi_m$ of each frequency carrier $p_m$ is recovered from the waveform echoed. The recovered initial phase $\phi_m$ of each frequency carrier $p_m$ is cyclically shifted in order to compensate for the Doppler effect. The recovered initial phase $\phi_m$ of each frequency carrier $p_m$ is decoded. A compressed pulse is synthesized from the decoded initial phases $(\phi_m)_{m° \epsilon° \{0, \ldots, N-1\}}$.

Preferably, the initial phase $\phi_m$ of each frequency carrier $p_m$ may be recovered from the waveform echoed by virtue of a Discrete Fourier Transform, which includes multiplying a vector s containing samples of the waveform echoed by a Discrete Fourier Transform matrix $\mathfrak{S}$, and which can be implemented through a Fast Fourier Transform (FFT) algorithm. The recovered initial phase $\phi_m$ of each frequency carrier $p_m$ may be cyclically shifted by a processing, which includes multiplying the output from the preceding algorithm by a matrix $C^{-1}$, the matrix C representing the shifting of the frequency carriers $(p_m)_{m° \epsilon° \{0, \ldots, N-1\}}$ due to the Doppler effect. The recovered initial phase $\phi_m$ of each frequency carrier $p_m$ may be decoded by a processing, which includes multiplying the output from the preceding processing by a matrix $P=\text{diag }\{\phi°\}$ where $\phi^T=[\phi_0 \phi_1 \phi_2 \ldots \phi_{N-1}]$. The compressed pulse may be synthesized from the decoded initial phases by virtue of an Inverse Discrete Fourier Transform, which includes multiplying the output from the preceding processing by the matrix $\mathfrak{S}^{-1}$, and which can be implemented through an Inverse Fast Fourier Transform (IFFT) algorithm.

For example, the frequency carriers $(p_m)_{m° \epsilon° \{0, \ldots, N-1\}}$ may be coded in phase by uniformly distributing their initial phases $(\phi_m)_{m° \epsilon° \{0, \ldots, N-1\}}$ over a $[0; 2\pi[$ interval. The frequency carriers $(p_m)_{m° \epsilon° \{0, \ldots, N-1\}}$ may also be coded in amplitude by applying a set of weightings. For example, the set of weightings may be a set of Hamming coefficients.

Preferably, the OFDM waveform may include OFDM chips and guard time intervals that may be transmitted successively to form a continuous wave transmission. The duration $T_{cyc}$ of the guard time intervals being longer than $$\frac{2R_{max}}{c},$$

where c is the speed of the light, which is the time necessary for the OFDM waveform to be reflected from a maximum range of interest $R_{max}$. Then, the recovered initial phases $\phi_m$ of each frequency carrier $p_m$ may preferably be cyclically shifted so as to cover all velocities of interest. This may enable to generate Doppler profiles that cover only the velocity range corresponding to the cyclic shift, thus solving the Doppler ambiguity.

Preferably, the energy in the ambiguity corresponding to $$f_d = (s+1)\frac{\Delta f}{(1+\alpha)}$$

may be lowered down to $$A_{s,OFDM} = \left|\text{sinc}\left(\frac{s\pi}{1+\alpha}\right)\right|,$$

where s is a positive integer and $\alpha$ is the ratio of the duration $T_{cyc}$ of the guard time interval to the duration of the OFDM chip.

BRIEF DESCRIPTION OF THE DRAWINGS

Non-limiting examples of the invention are described below with reference to the accompanying drawings in which.

DETAILED DESCRIPTION OF THE PREFERRED EMBODIMENTS

The signal structure utilizes multiple carriers forming the OFDM waveform. The OFDM waveform p(n) is the sum of carriers $p_k(n)$, presented in discrete form as $$p(n) = \sum_{m=0}^{N-1} x_m \exp\{j\phi_m\} \exp\left\{j2\pi m \Delta f \left(\frac{n}{N-1}\right) T\right\}, \quad (1)$$

where $x_m \exp\{j\phi_m\}$ is the amplitude and phase of the complex symbol modulating the carrier m, N is the number of carriers, and $T=1/\Delta f$ is the symbol duration with $\Delta f$ the carrier spacing. Thus, carrier m has amplitude $x_m$ and initial phase $\phi_m$. The complex symbols modulating each carrier can be considered as being transmitted in parallel. The processing method presented here imposes no limitations on the choice of the phases of the symbols, covering all phase coding schemes as applied in radar and communication applications.

The carriers are said to be orthogonal under the relation:

$$c_k = \sum_{n=0}^{N-1} \sum_{m=0}^{N-1} x_m \exp\{j\phi_m\} \exp\left\{\frac{j2\pi m \Delta f}{\left(\frac{n}{N-1}\right)T}\right\} \exp\left\{\frac{-j2\pi}{\left(\frac{n}{N-1}\right)}k\right\}. \quad (2)$$

The mathematical relationship between the orthogonal carriers hold only when the waveform, which is called an OFDM chip, is of duration $T=1/\Delta f$. Thus, the carriers are orthogonal at the receiver when the received frame is of duration T and completely overlaps with the transmitted chip.

To provide robustness against the multipath effects in the communication applications, the OFDM chip is preceded by a guard time interval, which has time duration longer than the channel response. The guard time interval is usually generated by copying a section with the required time duration from the end of the OFDM chip. Such guard time interval is called a cyclic prefix.

Figure 2:
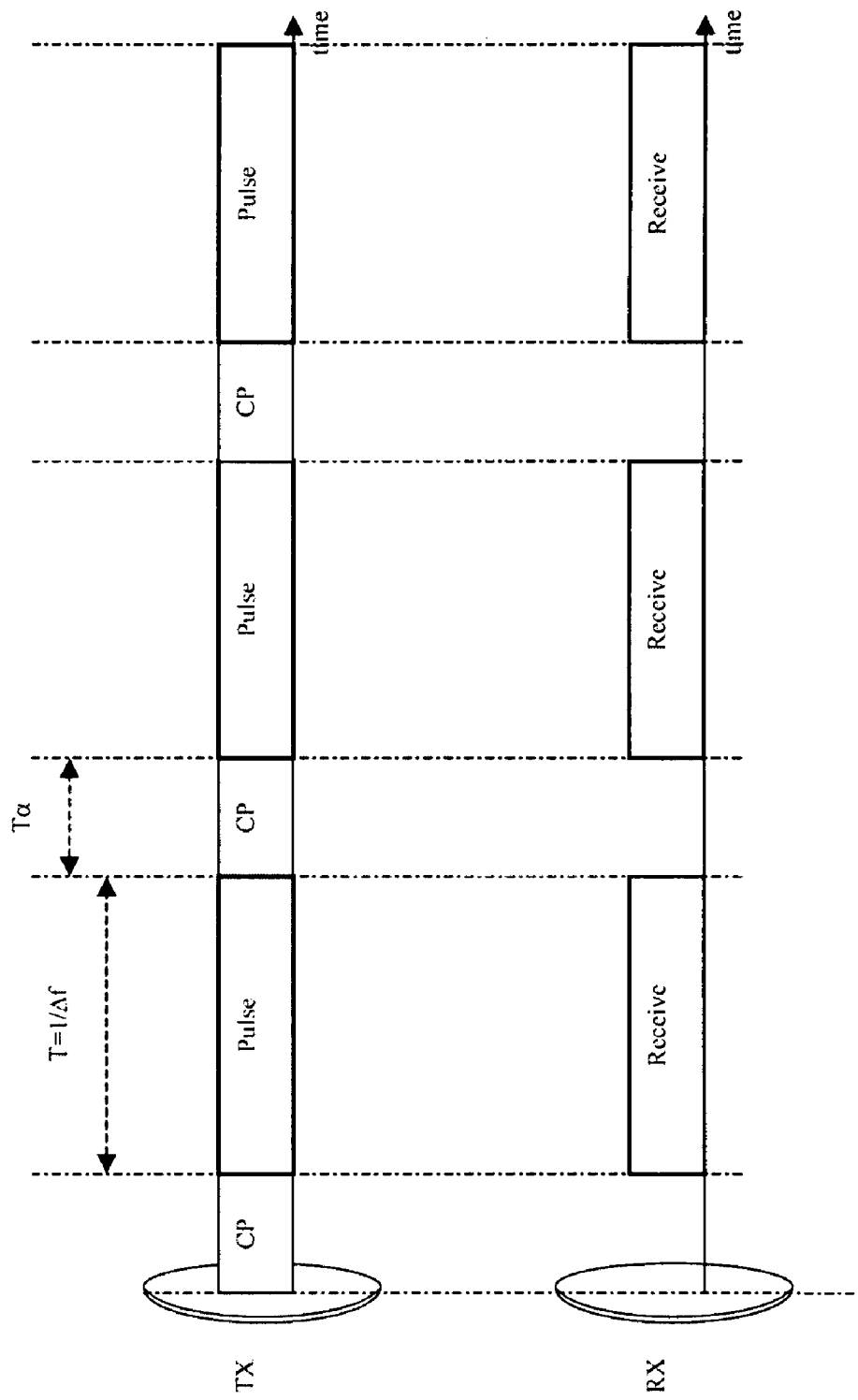
FIG. 2 illustrates a comparison of timing and range profile.

The timing of the transmission and reception, and their comparison with the range profile is given in FIG. 2. The transmitted OFDM chip is preceded by the cyclic prefix with duration $$T_{cyc} \geq \frac{2R_{max}}{c}, \quad (3)$$

where $R_{max}$ is the maximum target range that the radar has to detect the target, and c is the speed of the light. The OFDM chips constituting the pulse burst are transmitted successively without any interruptions; the transmitted waveform is actually continuous wave.

The received echo from a point target after down-conversion is $$s(t) = \sum_{m=1}^{N-1} \exp\left\{\begin{array}{c} j2\pi m \Delta f \left(1 - \frac{2v}{c}\right)\left(t - \frac{2R}{c}\right) - \\ j2\pi f_c \frac{2R}{c} - j2\pi f_c \frac{2v}{c}\left(t - \frac{2R}{c}\right) \end{array}\right\} \exp\{j\phi_m\} \quad (4)$$

where R is the range and v is the radial velocity of the point target, and $f_c$ is the RF carrier frequency. In this expression the time t starts at the beginning of the transmission of the actual OFDM chip. The receiving of the echoes starts as soon as the cyclic prefix ends and the actual chip starts being transmitted, and the receiving duration is equal to the chip duration. A key element of the OFDM scheme disclosed here is the carrier's being orthogonal to each other. The cyclic prefix extends the waveform duration such that that the echo received from the most distant target constitutes a complete OFDM chip during the received frame.

The pulse compression is accomplished by compensating the carriers for their initial phases. This operation concentrates the energy in the received echo around the time domain sample corresponding to the range of the target; thus, the OFDM waveform with zero initial phases on all carriers can be regarded as a pulse in time domain. Most of the energy of the waveform is concentrated on a narrow time span, which is determined by the bandwidth of the waveform. As in pulsed Doppler radar, the Doppler profiles are obtained as the outputs of the DFT over the compressed pulses for each range bin, since the phase variation from the peak of one pulse to the next gives the Doppler shift of the waveform.

OFDM waveform is composed of a number of orthogonal carriers, and the Doppler effect on the OFDM waveform can be considered as the shift of the spectrum by an amount determined by the radial velocity of the reflector. The spectrum property of the OFDM enables the Doppler compensation in a straightforward manner by implementing a cyclic shift of the FFT output in the receiver. In this manner no separate hardware is needed to implement the Doppler compensated matched filtering banks or to generate frequency shifted replicas of the reference signal.

Figure 1:
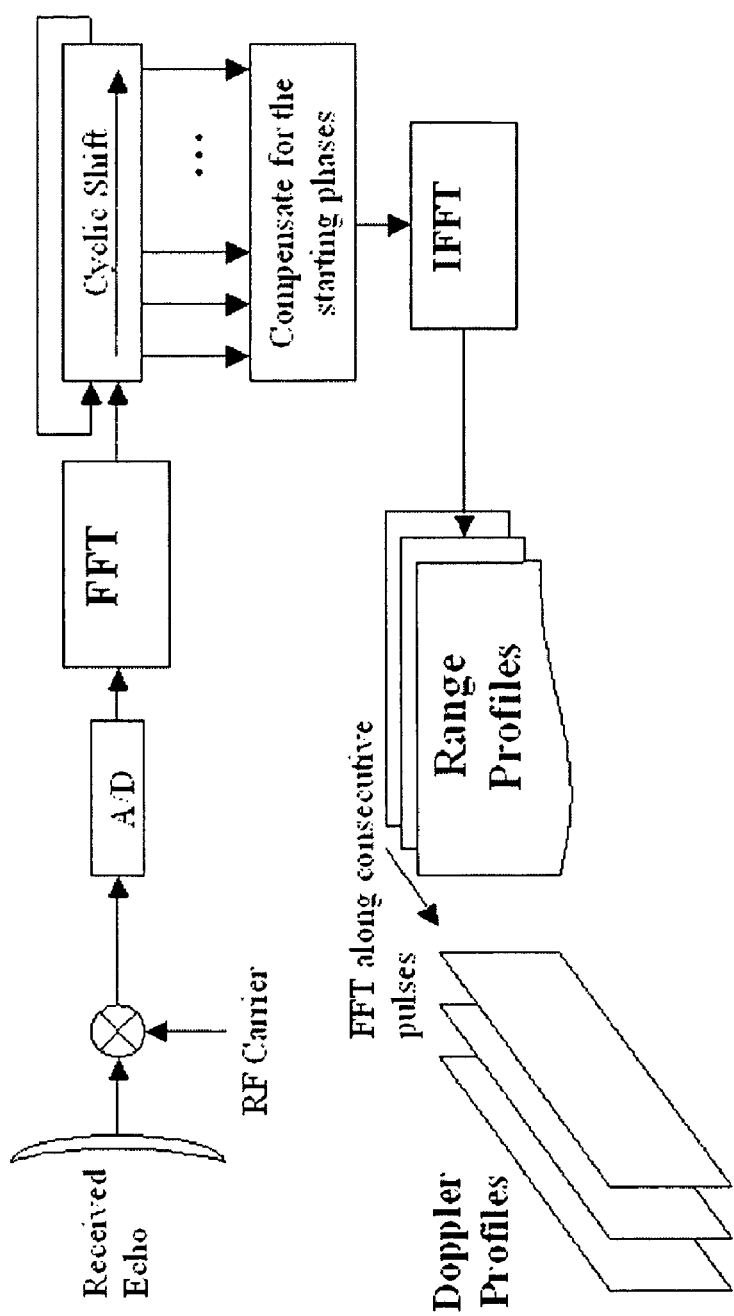
FIG. 1 illustrates a pulse burst Doppler processing scheme.

The Pulse Burst Doppler processing scheme is presented in FIG. 1. The Pulse Burst Doppler processing is presented here in matrix form. The received samples can be organized into a vector s such that $$s = \psi \Gamma \beta A \varphi, \quad (5)$$

where $$\psi = \exp\left\{-j2\pi f_c \left(1 - \frac{2v}{c}\right)\frac{2R}{c}\right\}, \quad (6)$$

$$\Gamma = diag\{1, \gamma, \gamma^2, \ldots, \gamma^{N-1}\}$$

and $$\gamma = \exp\left\{-j2\pi f_c \frac{2v}{c} \frac{1}{N\Delta f}\right\},$$

$$\beta = \begin{bmatrix} 1 & 1 & 1 & \ldots & 1 \\ 1 & \beta & \beta^2 & & \beta^{N-1} \\ 1 & \beta^2 & \beta^4 & & \beta^{2(N-1)} \\ \vdots & & & \ddots & \vdots \\ 1 & \beta^{N-1} & \beta^{2(N-1)} & \ldots & \beta^{(N-1)^2} \end{bmatrix}$$

and $$\beta = \exp\left\{-j2\pi\left(1 - \frac{2v}{c}\right)\frac{1}{N}\right\},$$

$$A = diag\{1, \alpha, \alpha^2, \ldots, \alpha^{N-1}\}$$

and $$\alpha = \exp\left\{j2\pi\Delta f\left(1 - \frac{2v}{c}\right)\frac{2R}{c}\right\},$$

$$\varphi^T = [\phi_0 \ \phi_1 \ \phi_2 \ \ldots \ \phi_{N-1}].$$

where $[\ ]^T$ is the transpose. The shifting of the carriers due to the Doppler effect is apparent in $\Gamma$ and $\beta$ matrices. The $\beta$ matrix is the same as an Inverse Discrete Fourier Transform (IDFT) matrix when $2v/c \ll 1$. The received signal model includes the time scaling due to the Doppler effect, which modifies the IDFT matrix in the OFDM transmitter scheme. The time scaling is neglected here by replacing β with the IDFT matrix $\Im^{-1}$.

The Doppler compensation aims to compensate for this shifting of the carriers due to the Doppler effect coming from the high frequency carrier. The Doppler compensation is accomplished by cyclically shifting the carriers back into their true locations. The received vector s is processed as $$y = PC^{-1}\Im s, \quad (7)$$

where P is the phase compensation matrix, $C^{-1}$ is the inverse cyclic shift matrix, and $\Im$ is the Discrete Fourier Transform (DFT) matrix, which is implemented by the FFT algorithm. Submitting s in (5) into (7) yields $$y = \Psi P C^{-1} \Im \Gamma \Im^{-1} A\phi \quad (8)$$

For the velocities:

$$\frac{2v}{c} = k\frac{f_c}{\Delta f}, \quad (9)$$

where k is an integer, multiplication of $\Im$ with $\Gamma$ from the right, as seen in (8), is equivalent to cyclical shifting of the rows of $\Im$. The cyclical shifting of the rows of the IDFT matrix can be represented in another form as $$y = \Psi P C^{-1} C \Im \Im^{-1} A\phi, \quad (10)$$

where C is the cyclic shift matrix. The cyclic shift matrix C represents the shifting of the carriers due to the Doppler effect. The IDFT matrix is implemented by an Inverse Fourier Transform (IFFT) algorithm. Hence, the inverse cyclic shift compensates for the effects of the Doppler, enabling the compensation of the initial phases correctly.

The phase compensation matrix P is such that $$P = \text{diag}\{\phi^*\} \quad (11)$$

where [ ]* is the complex conjugate. A matrix being diagonal allows the changing of the orders of the A and P matrices. As a result, the phase compensation cancels the beginning phases and only the elements of the matrix A is left in the resulting vector y, which is processed by an IDFT matrix. This processing technique is valid when the received waveform is oversampled in the frequency domain by zero padding before the FFT.

The deterioration of the pulse compression gain due to the Doppler effect is exploited to solve the ambiguity arising from the pulse repetition frequency of the pulse burst waveform. The change in the pulse compression gain due to Doppler shift can be determined by considering the ambiguity function of the OFDM waveform. The ambiguity function is defined as $$\chi(\tau, f_d) = \int_{-\infty}^{\infty} p(t) p*(t-\tau) \exp\{j2\pi f_d t\} dt \quad (12)$$

where p(t) is the transmitted waveform, τ is the delay and $f_d$ is the Doppler frequency. The processing method disclosed here is equivalent to the discrete form of the ambiguity function. Given in the matrix form in (5), s(n) is equivalent to the delayed and Doppler shifted version of the p(n). Thus, we may write the ambiguity function for single OFDM chip as $$\chi(\tau, f_d) = \int_0^T \left( \sum_{m=0}^{N-1} \exp\left\{ \begin{array}{c} j2\pi m\Delta f\left(t - \frac{2R}{c}\right) - \\ j2\pi f_c \frac{2R}{c} - \\ j2\pi f_c \frac{2v}{c}\left(t - \frac{2R}{c}\right) \end{array} \right\} \exp\{j\phi_m\} \right) \left( \sum_{k=0}^{N-1} \exp\{-j\phi_k\}\exp\{-j2\pi k\Delta ft\} \right) dt \quad (13)$$

which can be written as $$\chi(\tau, f_d) = \sum_{k=0}^{N-1} \sum_{m=0}^{N-1} \int_0^T \exp\left\{ \begin{array}{c} j2\pi m\Delta f\left(t - \frac{2R}{c}\right) - \\ j2\pi f_c \frac{2R}{c} - \\ j2\pi f_c \frac{2v}{c}\left(t - \frac{2R}{c}\right) \end{array} \right\} dt \quad (14)$$

$$\exp\{j\phi_m\}\exp\{-j\phi_k\}\exp\{-j2\pi k\Delta ft\}$$

$$= \sum_{k=0}^{N-1} \sum_{m=0}^{N-1} \int_0^T \exp\left\{ \begin{array}{c} j2\pi \Delta f\left(\frac{(m-k)t - }{\frac{2R}{c}}\right) - \\ j2\pi f_c \frac{2R}{c} - \\ j2\pi f_c \frac{2v}{c}\left(t - \frac{2R}{c}\right) \end{array} \right\} dt$$

$$\exp\{j\phi_m\}\exp\{-j\phi_k\}$$

where $$f_d = \frac{2v}{c} f_c,$$

and $$\tau = \frac{2R}{c}.$$

When completely random phases are used such that the expected value of the phase vectors in the complex plane is zero, the terms where m≠k are eliminated.

$$\chi(\tau, f_d) = \sum_{m=0}^{N-1} \exp\left\{ \frac{-j2\pi}{(\Delta f + f_c)\frac{2R}{c}} \right\} \int_0^T \exp\left\{ -j2\pi f_c \frac{2v}{c}\left(t - \frac{2R}{c}\right) \right\} dt \quad (15)$$

$$= \sum_{m=0}^{N-1} \exp\left\{ \left(\frac{\Delta f + f_c}{\left(1 - \frac{2v}{c}\right)}\right)\frac{2R}{c} \right\} \int_0^T \exp\left\{ \frac{-j2\pi f_c}{\frac{2v}{c}t} \right\} dt,$$

The magnitude of the ambiguity function can be simplified further to $$|\chi(\tau, f_d)| = \left| \sum_{m=0}^{N-1} \exp\left\{ -j2\pi\left(\frac{\Delta f + f_c}{\left(1 - \frac{2v}{c}\right)}\right)\frac{2R}{c} \right\} \right. \quad (16)$$

$$\left. \int_0^T \exp\left\{ -j2\pi f_c \frac{2v}{c} t \right\} dt \right|$$

-continued $$= \left| \sum_{m=0}^{N-1} \exp\left\{-j2\pi\left(\left(1-\frac{2v}{c}\right)\right)\frac{2R}{c}\right\} \right|$$

$$|\mathrm{sinc}(\pi f_d T)|$$

$$= N |\mathrm{sinc}(\pi f_d T)|,$$

This ambiguity function for single OFDM chip forms the basis for the ambiguity function of the pulse burst $$|\chi(\tau, f_d)|_B = |\mathrm{sinc}(\pi f_d T)| \left| \frac{\sin(\pi f_d KT(1+\alpha))}{K\sin(\pi f_d T(1+\alpha))} \right|, \quad (17)$$

which is derived in N. Levanon, "Radar Principles", Wiley 1988.

Figure 3:
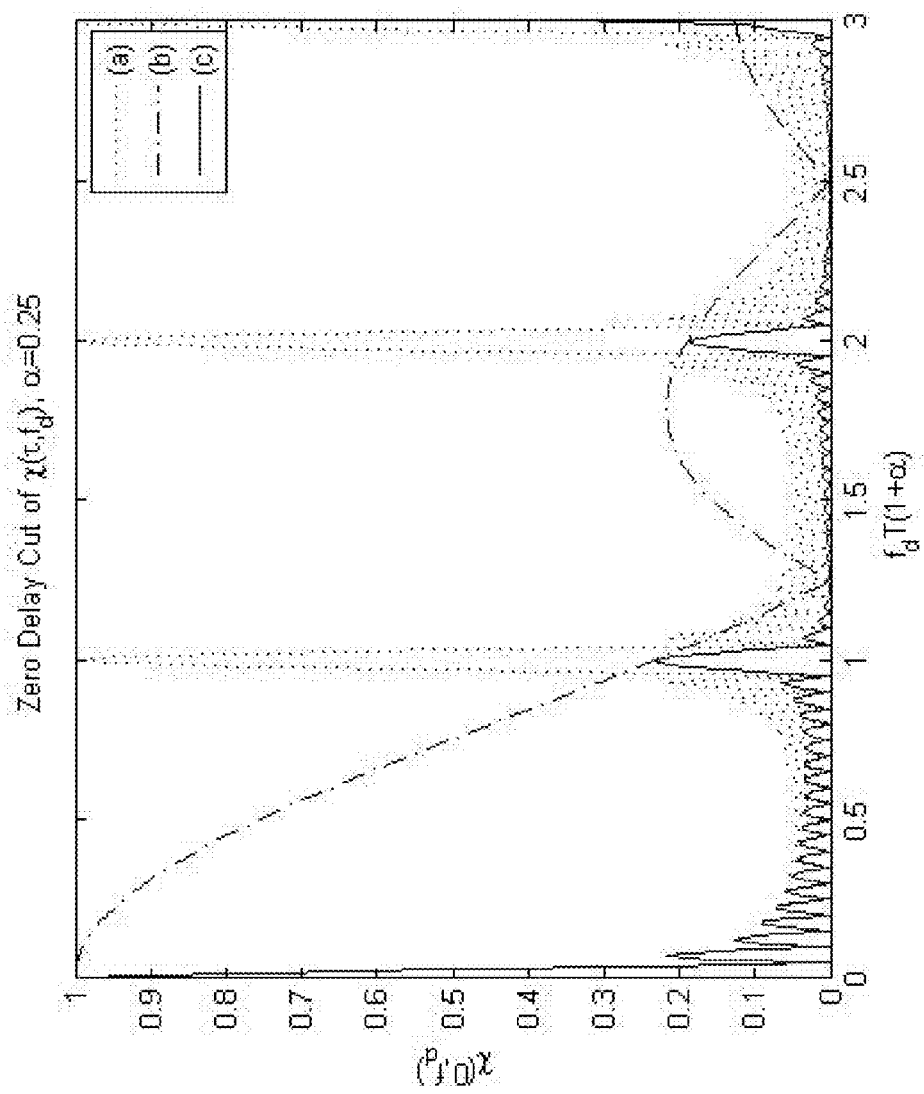
FIG. 3 illustrates a modification of the ambiguities in the case of a uniform pulse train, in the case of a single OFDM chip and in the case of an OFDM pulse train.

The compression gain modifies the ambiguity that is associated with the pulse repetition frequency of the pulse train, as depicted in FIG. 3. In the figure, the ambiguities associated with the pulse burst are separated by $$f_d = \frac{\Delta f}{(1+\alpha)}, \quad (18)$$

where α is the ratio of the guard time interval to the actual OFDM chip length T=1/Δf, while the nulls of the sinc(x)=sin(x)/x function are separated by $$f_d = \Delta f.$$

The ambiguities resulting from the use of the uniform pulse train are modified by the ambiguity of the single OFDM chip, which is a sinc function in the zero delay cut due to the use of completely random phases. The improvement is related to α, the ratio of the guard time interval to the actual OFDM chip length, through the equation $$A_{s,OFDM} = \left| \mathrm{sinc}\left(\frac{s\pi}{1+\alpha}\right) \right|, \quad (19)$$

where $A_{s,OFDM}$ is the amplitude of the ambiguity corresponding to $$f_d = (s+1)\frac{\Delta f}{(1+\alpha)},$$

s being a positive integer called the number of the ambiguity. The ambiguity occurs at each multiple of the pulse repetition frequency. The first ambiguity corresponds to s=1.

While with no guard time interval the ambiguities seem to be eliminated, the carriers of the OFDM waveform are not orthogonal anymore in that case. The pulse compression scheme, which relies on the carriers' being orthogonal, does not work anymore.

The Doppler compensation's acting as a filter provides a way of solving the ambiguity using one burst of pulses. As the pulse compression gain deteriorates with mismatched Doppler compensation, the ambiguous velocities requiring different Doppler compensation are separated from each other. Thus, the Doppler compensation provides a means to both improve the pulse compression by the compensation for the Doppler shift and solve the Doppler ambiguity in the final Doppler profiles resulting from the very low PRF.

Further improvement of the range response is possible by the proper selection of the initial phases of the carriers instead of uniformly distributed random phases and by applying weighting on the carrier amplitudes. Initial phases can also be arranged so as to reduce the PAPR.

The standard frequency tapering techniques can be applied as weighting of the carriers. Such tapering of the spectrum reduces the relative level of the range sidelobes. An example of such tapering techniques is Hamming window applied on the carriers. The Hamming weighting coefficients are generated through the equation $$A_n = 0.54 - 0.46\cos\left(2\pi\frac{n}{N-1}\right), \quad (20)$$

where n={0, 1, 2, ..., N−1} is the carrier number and $A_n$ is the coefficient corresponding to the carrier n. Lower sidelobes are observed with widening of the main lobe of the zero Doppler delay cut of the ambiguity function, while the zero delay Doppler cut is not modified significantly.

The maximum velocity that can be measured unambiguously by this processing technique corresponds to the Doppler frequency that is equal to the bandwidth of the transmitted OFDM signal, $$v_u = \frac{f_d c}{2f_c} = \frac{cN\Delta f}{2f_c}. \quad (21)$$

At this point the FFT coefficients are cyclically shifted by N to their original positions, which correspond to zero radial velocity.

Figure 4:
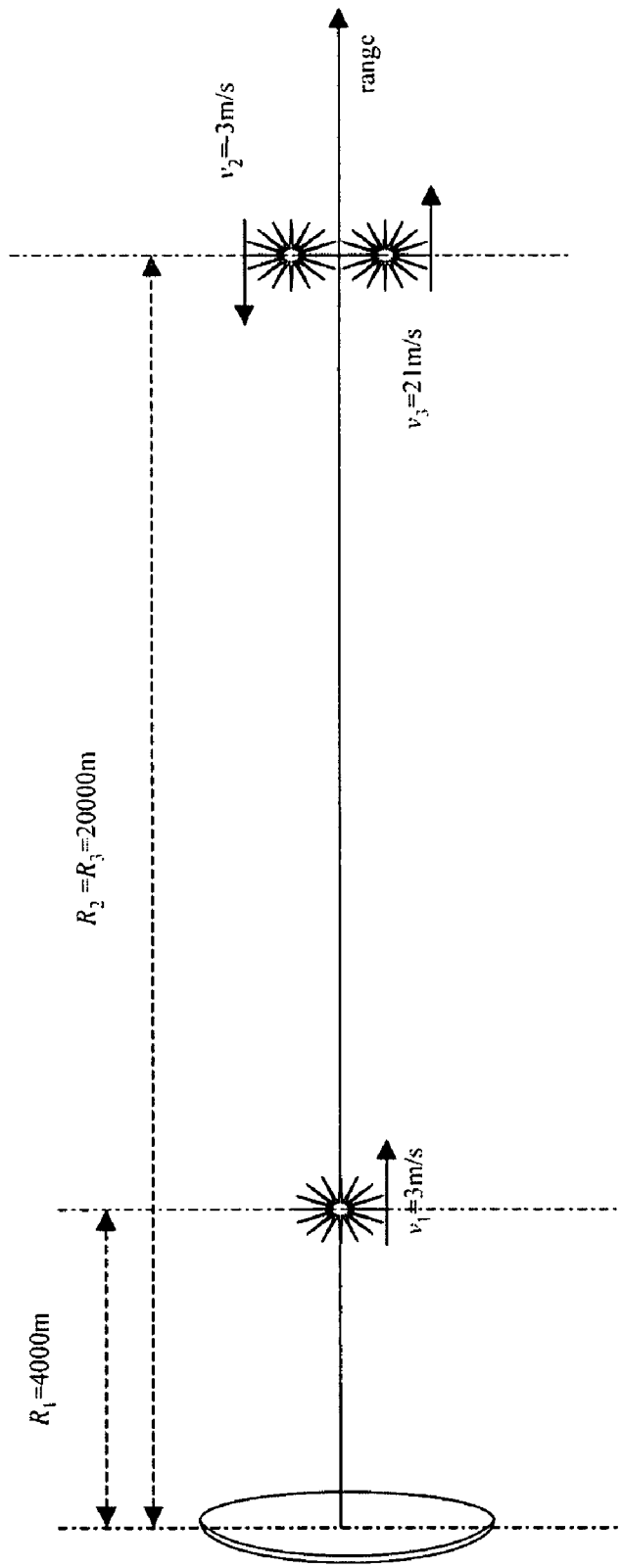
FIG. 4 illustrates an example of scenario.

Following is an example of the OFDM waveform and the results of the processing according to an embodiment of the invention. The waveform parameters and the target parameters used in the example are given in the tables 1 and 2 below. The scenario for the example is given in FIG. 4.

TABLE 1

Waveform parameters

| Parameter | Description | Value |
|---|---|---|
| N | No of carriers | 1024 |
| M | No of samples | 4 * N = 4096 |
| $f_c$ | RF carrier | 10 GHz |
| Δf | Carrier spacing | 1 kHz |
| $R_{max}$ | Maximum range | 37.5 km. |
| $T_{pulse}$ | Pulse period | 1.25 ms. |

TABLE 2

Target parameters

| Parameter | Description | Value |
|---|---|---|
| $R_1$ | Target 1 range | 4000 m |
| $R_2$ | Target 2 range | 20000 m |
| $R_3$ | Target 3 range | 20000 m |
| $v_1$ | Target 1 velocity | 3 m/s |
| $v_2$ | Target 2 velocity | −3 m/s |
| $v_3$ | Target 3 velocity | 21 m/s |

The unambiguous Doppler defined for conventional pulse burst processing is given as $$v_{unam} = \pm \frac{cf_p}{4f_c},$$

where $f_p$ is the pulse repetition frequency and $f_c$ is the high frequency carrier. For the continuous waveform including OFDM chips and cyclic prefix guard time intervals, the unambiguous Doppler is modified to $$v_{unam} = \pm \frac{c\Delta f}{4f_c(1+\alpha)},$$

where $\Delta f$ is the carrier spacing and $\alpha$ is the ratio of the length of the cyclic prefix to the actual chip length. For the numerical values given in Tables 1 and 2, the unambiguous velocity for the pulse burst Doppler processing is given as $$v_{unam} = \frac{3 \times 10^8 \times 10^3}{4 \times 10^{10} \times 1.25} = \pm 6 \text{ m/s}.$$

The unambiguous radial velocity for the single pulse Doppler processing is not defined, for the phenomenon observed in that processing technique is high sidelobes, which resemble the Sinc shape.

The resolution is related to the time on target through the equation $$v_{res} = \frac{c}{2T_{dwell}f_c}$$

For single pulse processing with the parameters as given above in Table 1, the radial velocity resolution is $$v_{res} = \frac{3 \times 10^8 \times 10^3}{2 \times 10^{10}} = 15 \text{ m/s}$$

and for pulse burst Doppler processing the radial velocity resolution is $$v_{res} = \frac{3 \times 10^8 \times 10^3}{2 \times 1.25 \times K \times 10^{10}} = \frac{12}{K} \text{ m/s},$$

where K is the number of pulses.

The processing scheme as seen in FIG. 1 generates range profiles for each pulse and for different amounts of cyclic shift, denoted by Sfft. The process can be implemented such that the acquired data is arranged in a 3-D matrix structure, where each row holds the information for one pulse, each column corresponds to one range bin and each page corresponds to an Sfft value. Thus, the output of the FFT for each pulse is stored in the memory of the receiver; to be shifted cyclically and processed further to extract radial velocity information after all the pulses are received.

Figure 5:
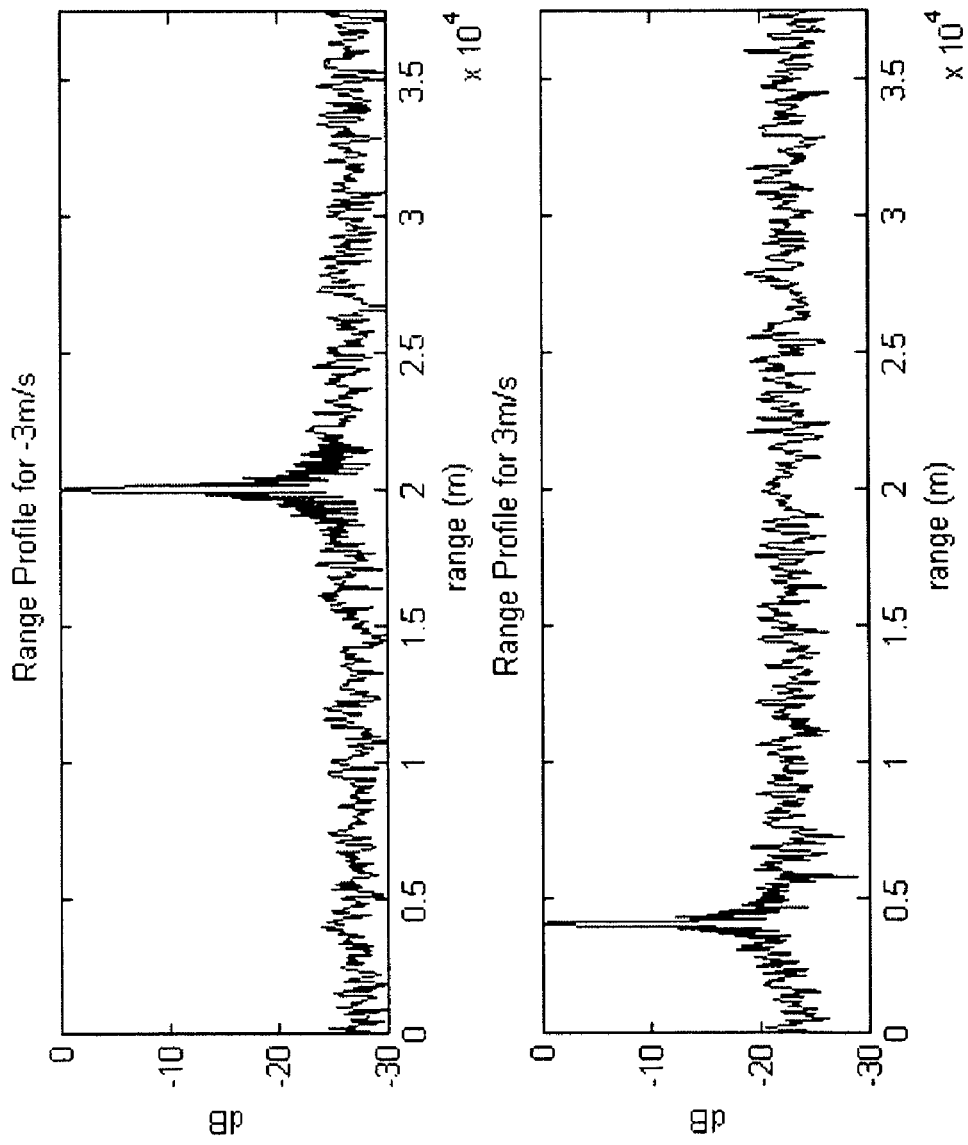
FIG. 5 illustrates range profiles for Doppler Fast Fourier Transform (FFT) outputs.

The range profiles for the Doppler FFT outputs, corresponding to the velocities of the targets, are given in FIG. 5. Summing the Doppler FFT outputs for all Sfft's that are searched generates the range profiles. The target ranges $R_1=4000$ m and $R_2=R_3=20000$ m are visible in the range profiles.

The cyclic shift by Sfft functions by decreasing the pulse compression gain for targets with radial velocities mismatched to the Sfft value. The absolute value of the outputs of the Doppler processing FFT along K=12 pulses for the range bin corresponding to R=20000 m are arranged to give the pulse compression gain behavior for the targets 2 and 3 for Sfft values in FIG. 6. The figures are generated with 8 times over-sampling by the zero-padding block before the FFT.

Figure 6:
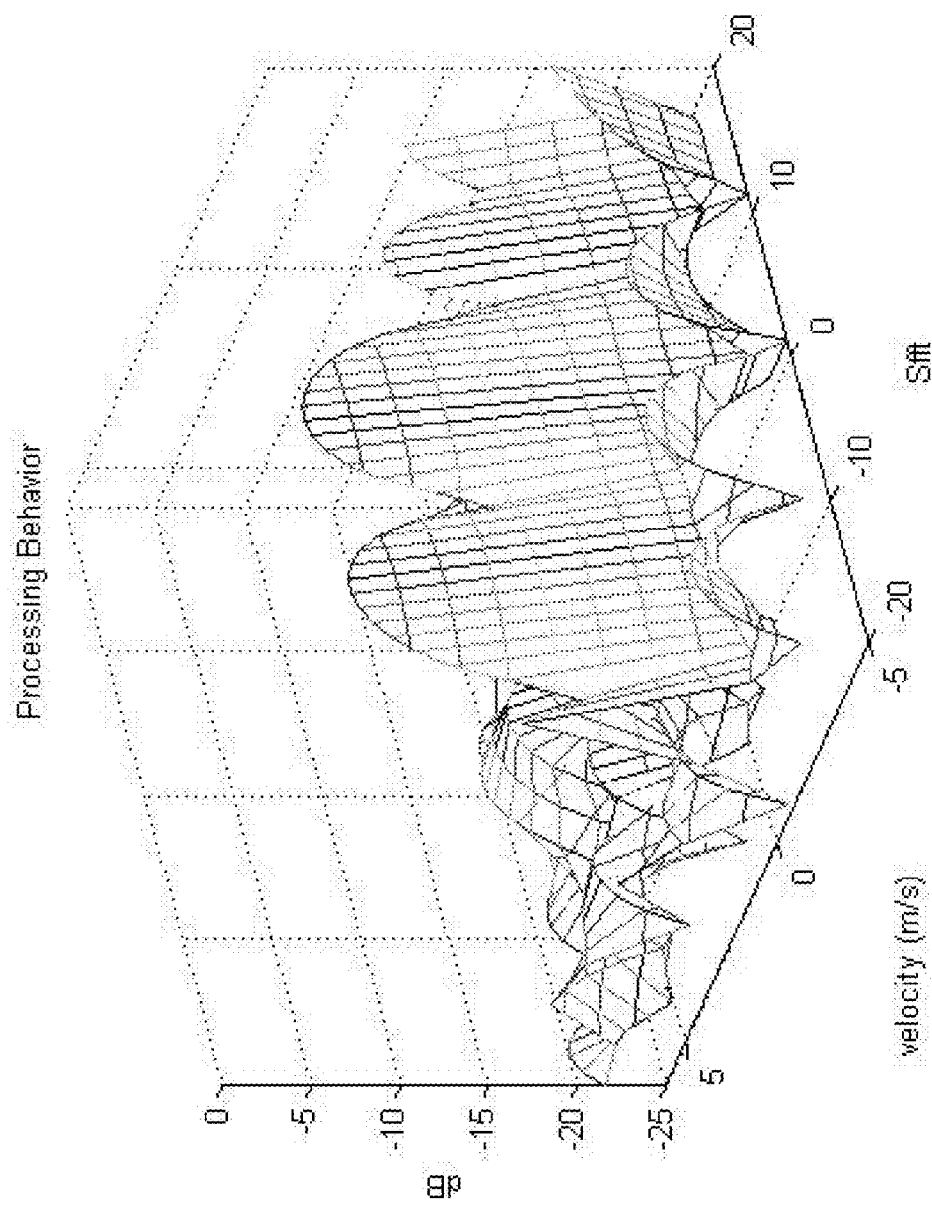
FIG. 6 illustrates a Doppler processing solving the ambiguity, overall response.
Figure 7:
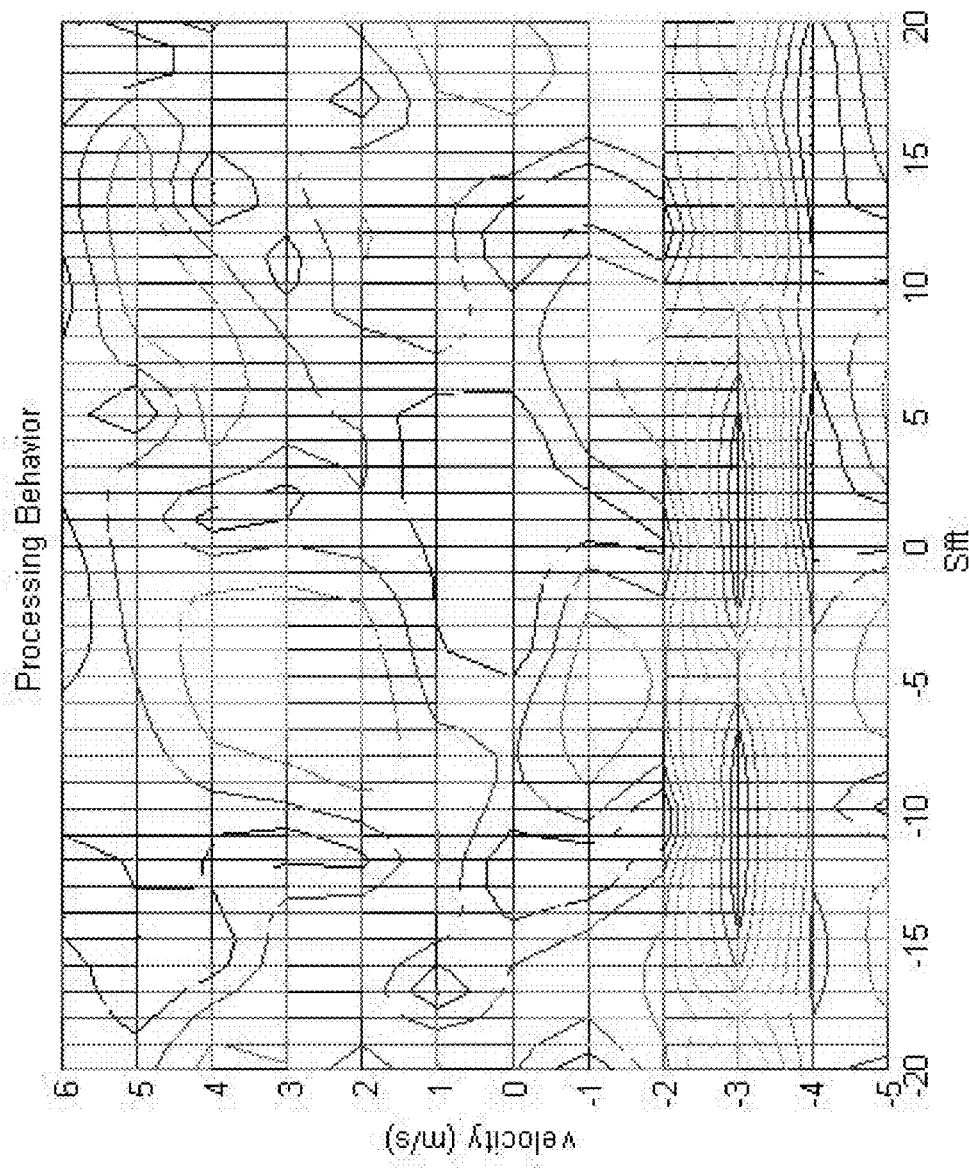
FIG. 7 illustrates a Doppler processing solving the ambiguity, FFT for different Doppler compensation.
Figure 8:
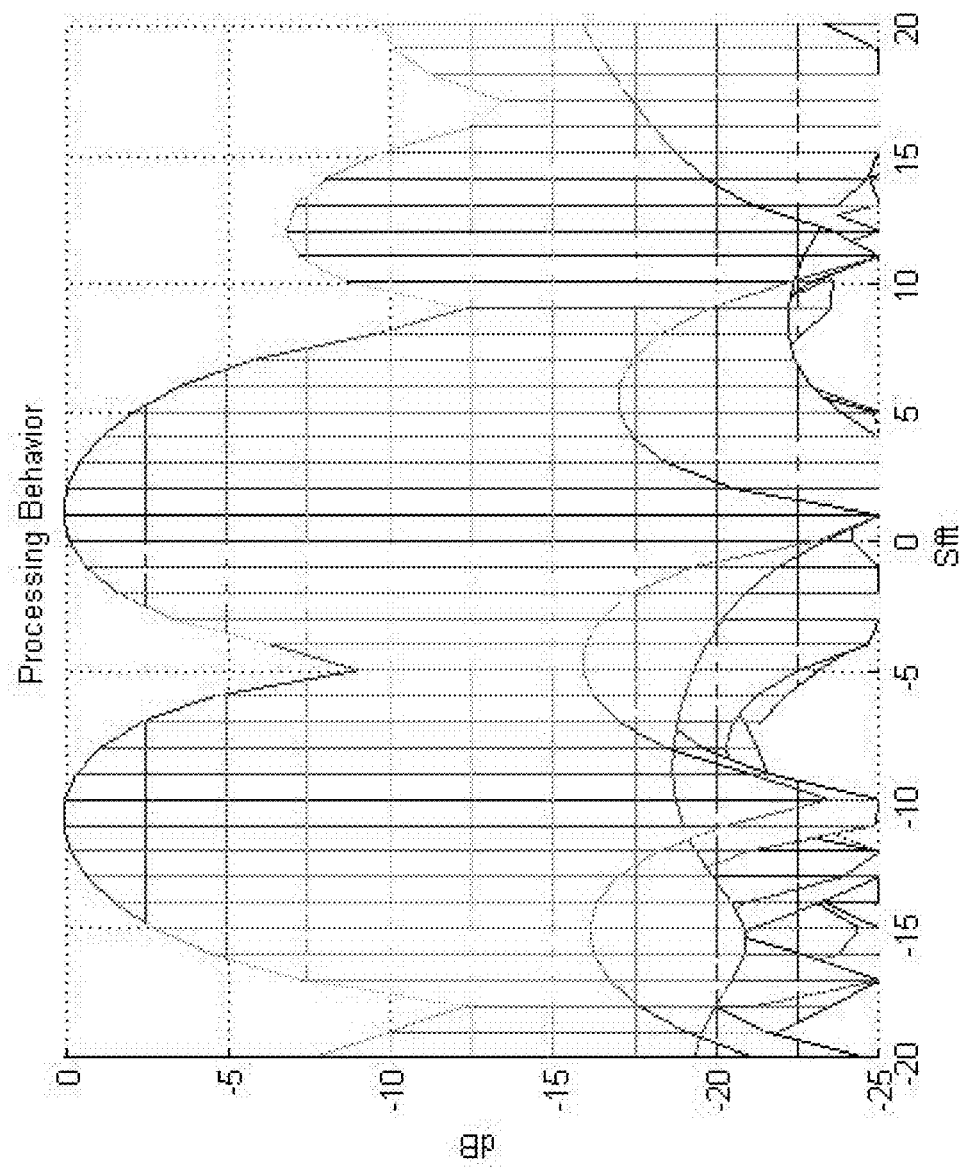
FIG. 8 illustrates a Doppler processing solving the ambiguity, Doppler compensation response.
Figure 9:
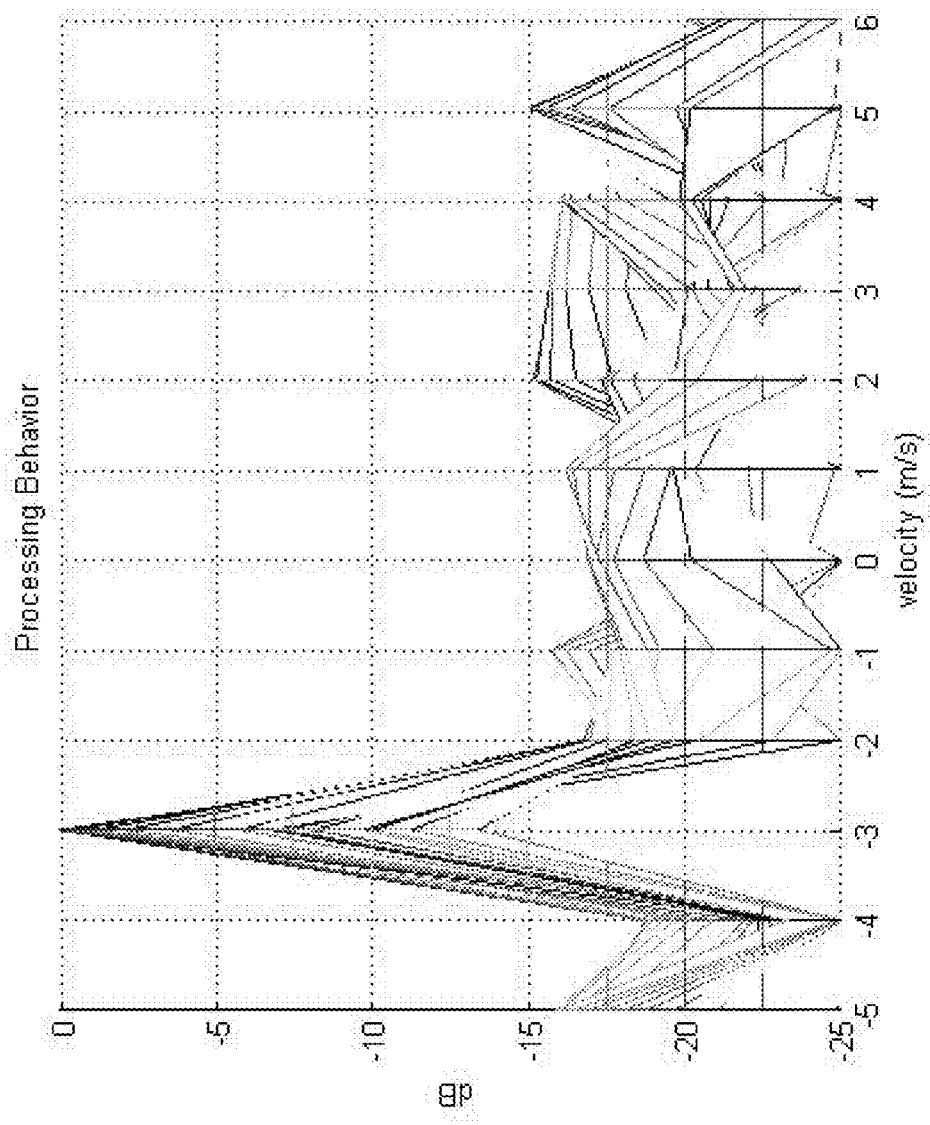
FIG. 9 illustrates a Doppler processing solving the ambiguity, ambiguity in the FFT response.

The views of FIG. 6 from different directions are given in FIG. 7, FIG. 8, and FIG. 9 for clarity. The contours in FIG. 7 show the two distinct peaks for the two targets at ambiguous velocities. The velocity ambiguity is evident from the peaks being located at v=−3 m/s, which can be observed in FIG. 9, and the ambiguity is resolved in the Sfft axis due to the change in the pulse compression gain, as seen in FIG. 8, where the sinc shaped pulse compression gain behavior is apparent.

For this example, the maximum unambiguous velocity that can be measured is $$v_u = \frac{f_d c}{2f_c}$$
$$= \frac{cN\Delta f}{2f_c}$$
$$= \frac{3 \times 10^8 \times 10^3 \times 1024}{2 \times 10^{10}}$$
$$= 15360 \text{ m/s},$$

when the cyclic shift equals to the number of carriers and is equivalent to applying no cyclic shift.

The invention claimed is:

1. A method for measuring a radial velocity of a target with a radar, within a maximum range $R_{max}$, comprising the steps of:
    transmitting an Orthogonal Frequency Division Multiplexing (OFDM) waveform p, the waveform comprising:
        N frequency carrier signals $(p_m)_{m\in\{0,\ldots,N-1\}}$ transmitted simultaneously, where $N\geq 2$, the frequency carrier signals $(p_m)_{m\in\{0,\ldots,N-1\}}$ coded in order to improve a Doppler response; and
        a plurality of OFDM chips and guard time intervals that are transmitted successively, on at least a portion of the N frequency carrier signals, to form a continuous wave transmission, wherein:
            a duration $T_{cyc}$ of the guard time intervals is longer than $$\frac{2R_{max}}{c},$$

which is a time necessary for the waveform p to be reflected from a maximum range of interest $R_{max}$, where c is a speed of light;
    receiving an echoed waveform from the target, to produce a received echoed waveform;
    recovering an initial phase $\phi_m$ of each frequency carrier signal $p_m$ from the received echoed waveform, to produce a recovered initial phase $\phi_m$;
    cyclically shifting the recovered initial phase $\phi_m$ of each frequency carrier signal $p_m$ by a cyclic shift in order to compensate for a Doppler effect, to produce a recovered and shifted initial phase $\phi_m$;

decoding the recovered and shifted initial phase $\phi_m$ of each frequency carrier signal $p_m$, to produce a plurality of decoded initial phases $(\phi_m)_{m \in \{0, \ldots, N-1\}}$;

synthesizing a compressed pulse from the plurality of decoded initial phases $(\phi_m)_{m \in \{0, \ldots, N-1\}}$;

wherein the step of recovering the initial phase $\phi_m$ of each frequency carrier signal $p_m$ from the echoed waveform further comprises a step of multiplying a vector s, containing samples of the echoed waveform, by a Discrete Fourier Transform matrix $\Im$ wherein the step of cyclically shifting the recovered initial phase $\phi_m$ of each frequency carrier signal $p_m$, further comprises a step of multiplying the recovered initial phase $\phi_m$ by a matrix $C^{-1}$, wherein the matrix $C^{-1}$ is an inverse of a matrix C that represents a shift of the frequency carrier signals $(p_m)_{m \in \{0, \ldots, N-1\}}$ due to the Doppler effect;

wherein the step of decoding the recovered and shifted initial phase $\phi_m$ of each frequency carrier signal $p_m$ further comprises a step of multiplying the recovered and shifted initial phase $\phi_m$ by a matrix $P=\text{diag}\{\phi^*\}$ where $\phi^T=[\phi_0\ \phi_1\ \phi_2\ \ldots\ N-1]$; and wherein the step of synthesizing the compressed pulse from the plurality of decoded initial phases further comprises multiplying the plurality of decoded initial phases by a matrix $\Im^{-1}$, wherein the matrix $\Im^{-1}$ is an inverse of the matrix $\Im$ wherein the recovered initial phases $\phi_m$ of each frequency carrier signal $p_m$ is cyclically shifted so as to cover substantially all velocities of interest, to generate Doppler profiles to cover the velocity range corresponding to the cyclic shift.

2. The method according to claim 1, wherein the frequency carrier signals $(p_m)_{m \in \{0, \ldots, N-1\}}$ are coded in phase by uniformly distributing the initial phases $(\phi_m)_{m \in \{0, \ldots, N-1\}}$ over a $[0; 2\pi[$ interval.

3. The method according to claim 1, wherein the frequency carrier signals $(p_m)_{m \in \{0, \ldots, N-1\}}$ are coded in amplitude by application of a set of weightings.

4. The method according to claim 3, wherein the set of weightings is a set of Hamming coefficients.

5. The method according to claim 1, wherein an energy in an ambiguity corresponding to $$f_d = (s+1)\frac{\Delta f}{(1+\alpha)}$$

is lowered to $$A_{s,OFDM} = \left|\text{sinc}\left(\frac{s\pi}{1+\alpha}\right)\right|,$$

where s is a positive integer and $\alpha$ is a ratio of the duration $T_{cyc}$ of the guard time interval to a duration of the OFDM chip.

* * * * *